F. WEED.
Cutting-Board.
No. 204,176.  Patented May 28, 1878.
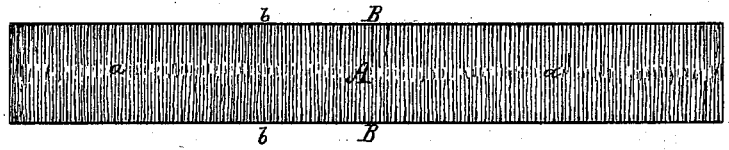
Witnesses.
S. N. Piper
John R. Snow
Inventor
Fitch Weed.
by his attorney
R. H. Eddy

UNITED STATES PATENT OFFICE.

FITCH WEED, OF LYNN, MASSACHUSETTS.

IMPROVEMENT IN CUTTING-BOARDS.

Specification forming part of Letters Patent No. 204,176, dated May 28, 1878; application filed February 28, 1878.

*To all whom it may concern:*

Be it known that I, FITCH WEED, late of New Bedford, of the State of Massachusetts, but at present residing in Lynn, of the county of Essex, of the said State, have made a new and useful Improvement in what are termed "Cutting-Boards," for the use of shoe-makers or others; and do hereby declare the same to be described as follows:

Cutting-boards as made without being saturated or impregnated, as herein described, with an oleaginous and resinous or gummy composition, soon, while in use, become so injured by the dies or cutting-knives as to require frequently to be replaced in order to keep them in a proper condition.

When treated or made as hereinafter explained, it has been found that the wood does not become disintegrated or broken away while in use, but springs apart under the cut of the knife, and subsequently closes and cements together. In consequence thereof the board is enabled to resist continual cutting for many months without apparent injury to it, in the meantime maintaining its surface smooth. It has also been found that with my improved board a knife or cutting implement will run much easier, and requires far less sharpening, than with a board of the kind in use before my invention, or not treated with the composition or its equivalent, as hereinafter explained. Furthermore, my improved die blocks or boards need not be more than half the thickness of those of the old kind.

In carrying out my invention, I apply to a pine or wooden board of proper size, endwise of its grain, by means of a brush or other suitable device, or by soaking the board in it, an oleaginous and resinous or gummy liquid composition, which I make as follows: Linseed-oil, one hundred pounds; resin, ten pounds; acetate of lead, one pound; litharge, two pounds. After well stirring them together and boiling them for about one hour there should be added one gallon of alcohol, which is better to have in a heated state. After the mixture or composition has become cool, there should be added to it about two ounces of borate of manganese.

The pores of the wood are to be filled or saturated with the solution, after which the board may be scraped or buffed, so as to render its cutting surface smooth and even.

The litharge, acetate of lead, and borate of manganese impart body and sufficiently drying qualities to the composition, while the linseed-oil prevents the gum or resin from becoming too hard, and with it forms a composition that will cause the pores of the wood, when separated by the knife, to readily close and cement together, the cut being thereby practically obliterated.

The accompanying drawing represents a section of cutting-board prepared in the above-described manner, A in such drawing being the wood, and B the oleaginous and resinous addition. In this board the grain is shown at *a* as ranging at right angles to the cutting surface or surfaces *b*.

What I claim as my invention is as follows—that is to say:

An improved cutting block or board, consisting of a wooden block or board having its surface saturated with an oleaginous and resinous or gummy solution, substantially as and for the purpose set forth.

FITCH WEED.

Witnesses:
R. H. EDDY,
JOHN R. SNOW.